US008724006B2

(12) United States Patent
Brady et al.

(10) Patent No.: US 8,724,006 B2
(45) Date of Patent: May 13, 2014

(54) FOCAL PLANE CODING FOR DIGITAL IMAGING

(75) Inventors: David Brady, Durham, NC (US); Michael D Feldman, Huntersville, NC (US); Nikos P. Pitsianis, Durham, NC (US)

(73) Assignees: FLIR Systems, Inc., Wilsonville, OR (US); Duke University, Durham, NC (US)

( * ) Notice: Subject to any disclaimer, the term of this patent is extended or adjusted under 35 U.S.C. 154(b) by 1658 days.

(21) Appl. No.: 10/784,472

(22) Filed: Feb. 24, 2004

(65) Prior Publication Data

US 2005/0162539 A1    Jul. 28, 2005

Related U.S. Application Data

(60) Provisional application No. 60/538,506, filed on Jan. 26, 2004.

(51) Int. Cl.
*H04N 5/225* (2006.01)

(52) U.S. Cl.
USPC ......... 348/340; 348/208.1; 348/291; 348/273

(58) Field of Classification Search
USPC ............... 348/340, 208.1, 291, 216, 226, 348/273–280
See application file for complete search history.

(56) References Cited

U.S. PATENT DOCUMENTS

| 4,479,143 | A | 10/1984 | Watanabe et al. |
| 4,804,249 | A | 2/1989 | Reynolds et al. |
| 5,355,222 | A | * 10/1994 | Heller et al. ............... 356/610 |
| 5,568,197 | A | 10/1996 | Hamano |
| 5,671,073 | A | 9/1997 | Psaltis et al. |
| 5,748,371 | A | 5/1998 | Cathey, Jr. et al. |
| 5,757,423 | A | 5/1998 | Tanaka et al. |
| 5,760,832 | A | 6/1998 | Yamanaka et al. |
| 6,069,738 | A | 5/2000 | Cathey, Jr. et al. |
| 6,137,535 | A | * 10/2000 | Meyers ..................... 348/340 |
| 6,346,969 | B1 | 2/2002 | Kwon |
| 6,366,319 | B1 | * 4/2002 | Bills ........................ 348/273 |

(Continued)

FOREIGN PATENT DOCUMENTS

| WO | WO 01/99431 | 12/2001 |
| WO | WO 02/077695 A1 | 10/2002 |
| WO | WO 03/024090 A1 | 3/2003 |
| WO | WO 2005/041561 A1 | 5/2005 |

OTHER PUBLICATIONS

Optics Express, vol. 11, No. 18, Sep. 8, 2003, "Color imaging with an integrated compound imaging system".*

(Continued)

*Primary Examiner* — Usman Khan
(74) *Attorney, Agent, or Firm* — Lee & Morse, P.C.

(57) ABSTRACT

An imaging system includes an array of lenses, a plurality of sensor pixels for each lens, the sensor pixels being on an image plane of the imaging system, and a corresponding plurality of focal plane coding elements. A focal plane coding element for each sensor pixel has multiple sub-pixel resolution elements. The focal plane coding element being between the lens and each sensor pixel, wherein sub-pixel resolution elements over the plurality of focal plane coding elements represent a selected transform matrix having a non-zero determinant. The output of the plurality of sensor pixels being an image multiplied by this matrix.

40 Claims, 3 Drawing Sheets

(56) References Cited

U.S. PATENT DOCUMENTS

| | | | |
|---|---|---|---|
| 6,414,296 | B1 | 7/2002 | Edwards |
| 6,417,950 | B1 | 7/2002 | Cathey, Jr. |
| 6,541,284 | B2 | 4/2003 | Lam |
| 6,611,289 | B1 | 8/2003 | Yu et al. |
| 6,632,701 | B2 | 10/2003 | Merrill |
| 6,882,364 | B1 | 4/2005 | Inuiya et al. |
| 7,003,177 | B1* | 2/2006 | Mendlovic et al. ........... 382/299 |
| 7,009,652 | B1* | 3/2006 | Tanida et al. ................. 348/340 |
| 7,034,866 | B1 | 4/2006 | Colmenarez et al. |
| 2002/0089596 | A1 | 7/2002 | Suda |
| 2002/0163582 | A1 | 11/2002 | Gruber et al. |
| 2002/0181123 | A1 | 12/2002 | Han |
| 2002/0181126 | A1 | 12/2002 | Nishioka |
| 2005/0073603 | A1* | 4/2005 | Feldman et al. .............. 348/340 |
| 2005/0104991 | A1 | 5/2005 | Hoshino et al. |
| 2005/0128335 | A1 | 6/2005 | Kolehmainen et al. |
| 2005/0242410 | A1 | 11/2005 | Groot et al. |
| 2005/0248680 | A1 | 11/2005 | Humpston |
| 2005/0258350 | A1 | 11/2005 | Van Arendonk |
| 2006/0044450 | A1 | 3/2006 | Wolterink et al. |

OTHER PUBLICATIONS

Applied Optics, vol. 40, No. 11, Apr. 10, 2001, "Thin observation module by bound optics (TOMOBO) concept and experimental verification".*

Dowski, Jr., et al., "Aberration Invariant Optical/Digital Incoherent Optical Systems" Imaging Systems Laboratory, Dept of Electrical Engineering, U. Colorado, Boulder CO. [Publisher, Date—unknown].

Dowski, Jr., et al., "Wavefront Coding: A modern method of achieving high performance and/or low cost imaging systems", [Publisher, Date—unknown].

Kubala, et al., "Reducing complexity in computational imaging systems", Optical Society of America, copyright 2003.

Mait, et al, "Evolutionary paths in imaging and recent trends", Optics Express vol. 11, No. 18, pp. 2093-2101 (Sep. 8, 2003).

Potuluri, et al., "High depth of field microscopic imaging using an interferometric camera", Optics Express, vol. 8, No. 11, pp. 624-630 (May 21, 2001).

* cited by examiner

FOCAL PLANE CODING FOR DIGITAL IMAGING

CROSS-REFERENCE TO RELATED APPLICATION

The present application claims priority under 35 U.S.C. §119(e) U.S. Provisional Application Ser. No. 60/538,506 filed Jan. 26, 2004 and entitled "focal Plane Coding for Digital Imaging" which is incorporated herein by reference in its entirety.

BACKGROUND

Imaging system design begins with the focal plane. Assume the focal plane has pixels of a size p, with a size of the image on the focal plane being d. The number n of pixels is n=d/p. The N.A. or numerical aperture roughly determines the field of view of the system, and is defined as N.A.=$n_0$ sin θ, where $n_0$ is the refractive index of the medium through which the light has traveled. Assuming the medium is air and the small angle approximation is valid, $n_0 \approx 1$, so N.A.=sin θ. The angular resolution is $\Delta\theta_p$=p/f due to the focal plane and $\Delta\theta_\lambda$=λ/d due to the diffraction limit. Since f and d are related by the N.A., $\Delta\theta_p/\Delta\theta_\lambda$=N.A.p/λ. Thus, for a given focal plane, the angular resolution is inversely proportional to f, meaning that the thicker the system, the better the angular resolution. Additionally, the size and number of pixels determine the spatial resolution.

If p could be reduced by a desired scaling factor, then f could be reduced by an order of magnitude, while maintaining the resolution of the system. However, there are limits on the ability to enhance imaging by simply increasing the density of pixels. Further, post-processors cannot process information that has not been captured by the imaging system. Additionally, increased optical performance often means increased complexity.

Thus, techniques other than simply increasing pixel density and reliance on post processing are needed to advance imaging systems. Desired advances include reducing camera thickness, improving resolution and improving data efficiency.

Current attempts to achieve these advances include integrated computational imaging systems (ICIS). The design of ICIS simultaneously considers optics, optoelectronics and signal processing, rather than independently designing the optics. System performance for the ICIS is realized through joint optimization of optics, focal plane optoelectronics and post-detection algorithms. The computational imaging used to balance processing between optics and electronics are typically classified into three categories: wavefront encoding, multiplex imaging and feature extraction. Wavefront encoding involves modifying the wavefront phase at or near the pupil plane of an imaging system. In multiplex imaging, typically the optics introduce redundant information used in post-processing detection. In direct feature extraction, feature extraction estimates are made of transform coefficients that are then used to make a decision. Often, all three categories are employed.

Typically, ICIS use non-focal sensors, e.g., interferometric systems, wavefront coded systems. The purposeful blurring attendant with such non-focal sensors, which is then removed in post-processing, provides multiplexing in the optical field. However, this blurring does not exploit the point of high field entropy of the system. For conventional imaging of remote objects, highest entropy is at the focal plane. Thus, rather than using the information inherent in one-to-one mapping, i.e., that there is a relationship between spatially separated regions, the detectors of these systems are acting as pixel sensors rather than image sensors.

SUMMARY OF THE INVENTION

It is a feature of an embodiment of the present invention to provide an imaging system having sub-pixel resolution. It is another feature of an embodiment of the present invention to provide multiplexing while still analyzing a true image. It is another feature of an embodiment of the present invention to provide imaging systems of reduced thickness while maintaining resolution and/or to improve resolution and data efficiency.

At least one of the above and other features may be realized by applying ICIS at the focal plane of the imaging system.

At least one of the above and other features may be realized by multiplexing in the electrical plane.

At least one of the above and other features may be realized by providing an imaging system including an array of lenses, a plurality of sensor pixels for each lens, the sensor pixels being on an image plane of the imaging system, and a corresponding plurality of focal plane coding elements. A focal plane coding element for each sensor pixel has multiple sub-pixel resolution elements. The focal plane coding element being between the lens and each sensor pixel, wherein sub-pixel resolution elements over the plurality of focal plane coding elements represent a selected transform matrix having a non-zero determinant. The output of the plurality of sensor pixels being an image multiplied by this matrix.

The filter may provide sub-pixel shifted multiple images on each sensor pixel. The focal plane coding element may be an apertured mask. The imaging system may include color filters, which may be integral with the focal plane coding element. A birefringent structure may be adjacent the focal plane coding element. A corresponding plurality of focusing lenses may be included between the focal plane encoding element and a corresponding sensor pixel. The selected transform matrix has fewer rows than columns. At least one sensor pixel receives light from more than one lens of the array of lenses.

A processor receiving the outputs of the sensor pixels and multiplying the outputs by an inverse matrix may be included. The processor may reconstruct an image from the outputs, a number of image pixels in the image being greater than the plurality of sensor pixels.

At least one of the above and other features may be realized by providing an imaging system including an array of lenses, a plurality of sensor pixels for each lens, a corresponding plurality of filters, and a processor. A filter for each sensor pixel has multiple sub-pixel resolution elements and provides a sub-pixel shifted multiple image on each sensor pixel. The processor receives outputs from each sensor pixel and reconstructs an image, a number of image pixels in the image being greater than the plurality of sensor pixels.

BRIEF DESCRIPTION OF THE DRAWINGS

The above and other features and advantages of the present invention will become readily apparent to those of skill in the art by describing in detail embodiments thereof with reference to the attached drawings, in which.

DETAILED DESCRIPTION

Figure 1:
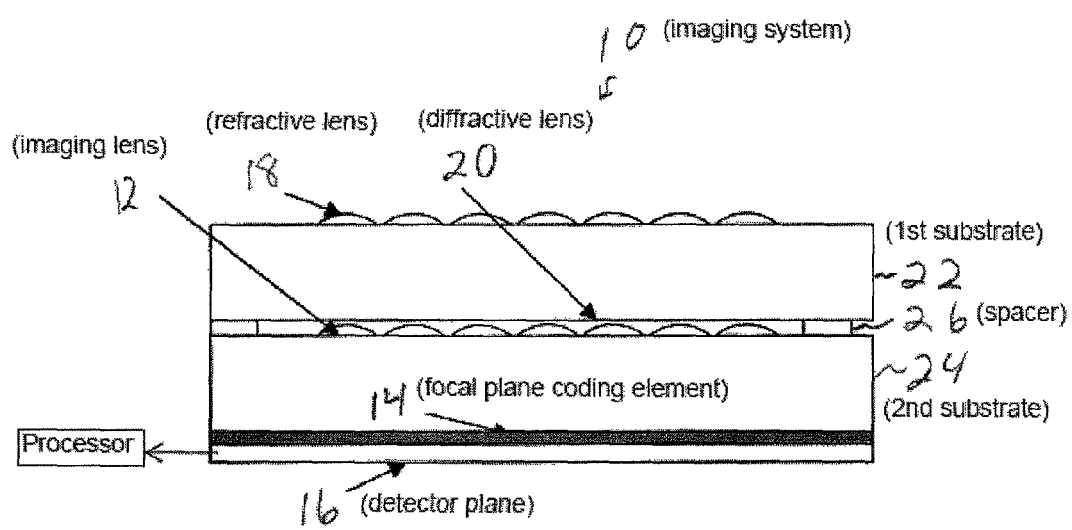
FIG. 1 is a schematic side view of an array of microcameras according to an embodiment of the present invention.

U.S. Provisional Application Ser. No. 60/538,506 filed Jan. 26, 2004 and entitled "Focal Plane Coding for Digital Imaging" is herein incorporated by reference in its entirety for all purposes.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the concept of the invention to those skilled in the art. In the drawings, the thickness of layers and regions are exaggerated for clarity. It will also be understood that when a layer is referred to as being "on" another layer or substrate, it may be directly on the other layer or substrate, or intervening layers may also be present. Further, it will be understood that when a layer is referred to as being "under" another layer, it may be directly under, or one or more intervening layers may also be present. In addition, it will also be understood that when a layer is referred to as being "between" two layers, it may be the only layer between the two layers, or one or more intervening layers may also be present. Like numbers refer to like elements throughout.

FIG. 1 illustrates a multiple aperture imaging system 10. Each aperture includes an imaging lens 12, a focal plane coding element 14 and a detector plane 16. The detector plane 16 is located at or near the image plane of the system 10. The detector plane 16 for each aperture includes a plurality of pixels in accordance with a size of an image at the image plane and the selected detector size.

In addition to the imaging lens 12, each aperture may include a plurality of substrates 22, 24, which may be separated by a spacer 26. The spacer 26 may be integral with one of the substrates 22, 24 or may be formed on a separate spacer substrate. In the particular embodiment shown, a first refractive lens 18 is on a top surface of the substrate 22, a diffractive lens is on a bottom surface of the substrate 22 and the imaging lens 12 is on a top surface of the substrate 24. The diffractive lens 20 may correct for aberrations.

Here, the focal plane coding element 14 is provided on or adjacent to a bottom surface of the substrate 24 and the detector plane 16 is provided on or adjacent to the focal plane coding element 52. Additional substrates providing additional surfaces with optical power therein may be provided in a similar fashion as dictated by the requirements of the system 10. The substrates 22 and 24 may have surfaces parallel with one another and may be bonded together across the system 10 as shown in FIG. 1.

The focal plane coding element 14 samples and/or remaps the focused image for coded multiplexing at the optical-electronic interface. The outputs of the detector plane are provided to a processor 30, which electrically process the information as discussed below. Here, there is no multiplexing of the optical field, since the image is isomorphic and well focused at the focal plane. Rather, multiplexing occurs from the pixels sampling multiple optical resolution elements. The focal plane coding is to maintain the focal distribution while remapping sampling across the image plane to enable digital reconstruction of the image.

In a conventional imaging system, the focal plane averages wavelength scale features within each pixel. A pixel measurement m may be modeled as in Equation (1):

$$m = \int_A I(r)\,dr \tag{1}$$

where A is the area of the pixel and I is the intensity.

With compressive coding of the present invention, the pixel measurement is given by Equation (2):

$$m_{ij} \int p_{ij}(r) I(r)\,dr \tag{2}$$

where $p_{ij}(r)$ is the focal plane code in the focal plane coding element 14 for the $i^{th}$ pixel in the $j^{th}$ aperture of the multi-aperture system 10.

Compressive imaging uses focal plane coding to allow reconstruction of images having a higher spatial resolution than the number of pixels, i.e., detector elements, on the focal plane. In other words, if the number of image pixels is greater than the number of physical pixels. If the image is broken into sub-blocks, a linear transformation as shown in Equation (3) may be implemented on each sub-block:

$$m = Hs \tag{3}$$

where s is the source or actual image and H is a rectangular transform. The rectangular transform may be non-local and non-convex. Different known rectangular transforms may be used, such as Hadamard, discrete cosine and quantized cosine, in which the discrete consine transform is rounded to correspond to a value in the set of the quantized cosine transform.

These transforms provide multiple lower resolution, i.e., pixel level, shifted with sub-pixel accuracy which are detected to recover a single higher resolution, i.e., sub-pixel level, image. Thus, the multiplexing is done at the electrical plane, since each detector samples multiple resolution elements.

In accordance with the present invention, the outputs of the detector plane 16 to a processor or electrical plane 30 are not the image itself, but a matrix multiple of the image. Any appropriate matrix may be used, as long as the determinant of the matrix is not zero. Preferably, the matrix will allow as much power as possible on each pixel through to the detector plane 16. The processor may then take the inverse matrix transform to retrieve the image.

In the system 10 as shown in FIG. 1, the focal plane coding element may be created having the focal plane code $p_{ij}(r)$ in accordance with H. An inverse transform $H^{-1}$ is applied by the processor 30 to the measurement m detected at the detecting plane 16 to get the estimated image. The difference between the estimated image and the real image is the noise of the system 10.

Different mechanisms may be used to realize physical implementation of the focal plane coding element 14 to provide multiple optical resolution elements for each detector. One such mechanism is coded masks created in accordance with the transform matrix selected. Such masks may include opaque amplitude patterns on optical transparent materials. These patterns may also be combined with surface relief structures to provide both phase and amplitude mapping. Breaking the image into sub-blocks, the transformation may be implemented on each sub-block.

Figure 2:
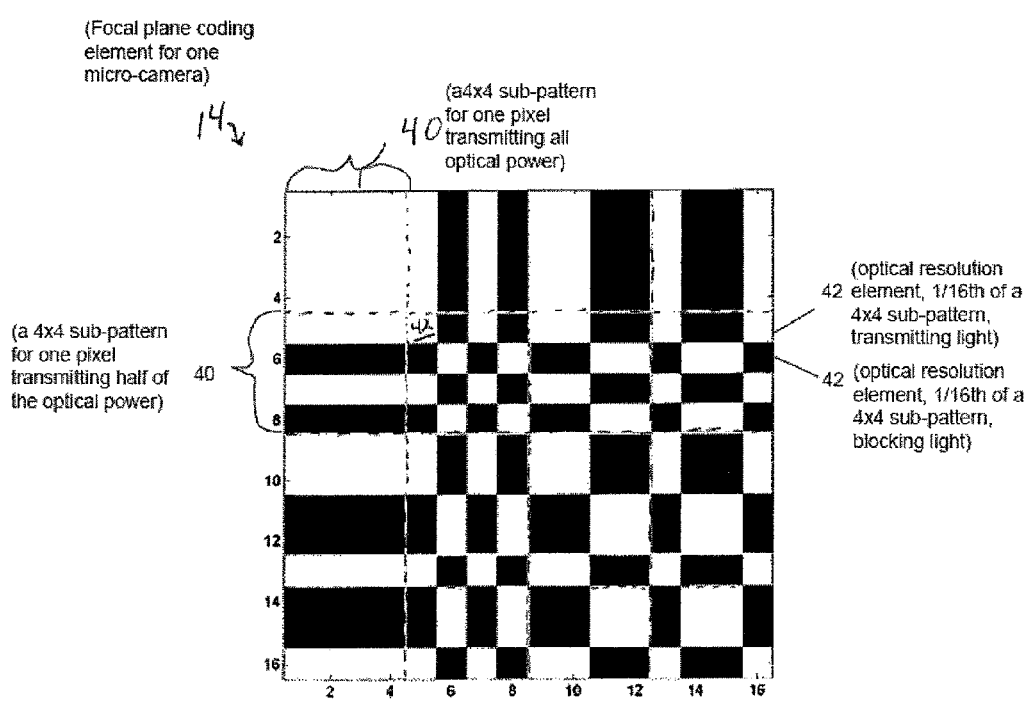
FIG. 2 is an example of a mask to be used as a focal plane coding element in accordance with an embodiment of the present invention.

An example of a mask pattern for a 4×4 sub-block is shown in FIG. 2. The particular transform H in this example is a Hadamard-S matrix, which is a [0,1] matrix obtained by shifting the Hadamard matrix elementwise up by one and scaling it by half. As shown in FIG. 2, a pixel filter 40 of the focal plane coding element 14, here a mask pattern, corresponding to each pixel is segmented into a 4×4 grid of optical resolution elements or apertures 42, where a value of one is represented as white and a value of zero is represented as black.

Actually, FIG. 2 shows the mask pattern for a particular matrix for Equation (3). Each 4×4 sub-pattern is placed over each pixel. Within each micro-camera, each pixel receives a different portion of the image. Between micro-cameras, each corresponding receives identical or nearly identical images. FIG. 2. shows the mask patterns on each of these corresponding pixels over the camera array. That is, each of these corresponding pixels in different micro-cameras, that receive near identical images, will be multiplied a different 4×4 sub-pattern. This may be most readily achieved by providing a same sub-pattern for each pixel in a given micro-camera. Over the array of micro-camera, each pixel may be multiplied by each 4×4 sub-pattern.

As can be seen in FIG. 2, all incident optical power is transmitted onto one of the pixels. Most of the pixels have half or more of the power transmitted thereon. Each optical resolution element 42 will multiply the image with the matrix component for that optical resolution element 42.

Ideally, the amount of power incident on each pixel should be maximized. This may be realized by examining the pixel with least amount of power thereon and altering the matrix to optimize this pixel while still keeping the determinant non-zero. Such optimization may be iterative.

In the example shown in FIG. 2, each pixel receives light from an area 40 including a plurality, here 4×4, optical resolution elements 42. More generally, each pixel has a size $p_x p_y$, and each pixel filter 40 has a size $d_x d_y$ with a plurality of $m_x m_y$ optical resolution elements 42 of size $q_x q_y$. Normally, such a camera would have a resolution of $1/p_x \times 1/p_y$. The size of the pixel region 40 $d_x d_y$ may be the same as or greater than the pixel size $P_x P_y$. Thus, the power incident on each pixel is equal to a summation, over all optical resolution elements 42 on the corresponding pixel filter 40, of the power on each optical resolution elements 42 multiplied by the transmittance of the optical resolution elements 42. In this case, the resolution of the camera may now be as low as $1/q_x \times 1/q_y$.

Additional distribution of the image onto the pixels may be combined with these masks to allow remapping of the image. For example, separating of the image into vertical and horizontal polarization modes can be used to create coding elements that displace focal images across the image plane without diffraction. If a suitable birefringent material is available in the wavelength region of interest, this material may be used for the mask. If this is not practical, subwavelength structures presenting different effective indices of refraction for the vertical and horizontal polarization states may be incorporated.

Color images may be realized with the system 10 by placing different color filters in the path of different elements in the detection plane 16. Typically, three color filters, e.g. red, green and blue, are required, so each color filter may be in a path of a third of the macro-pixels. Since the eye is more sensitive to green, in many cases more green filters are used than red and blue, e.g. 25% of the pixels have blue and red filters and 75% have green filters Alternatively, color sensitive rather than binary absorption masks may be used as the coding elements in the focal plane coding element 16. Since a color filter for a given wavelength will absorb most of the other wavelengths, this color filter can serve as providing a value of one (or high transmittance) for the design wavelength and a value of zero (or low transmittance) for other wavelengths.

Figure 3:
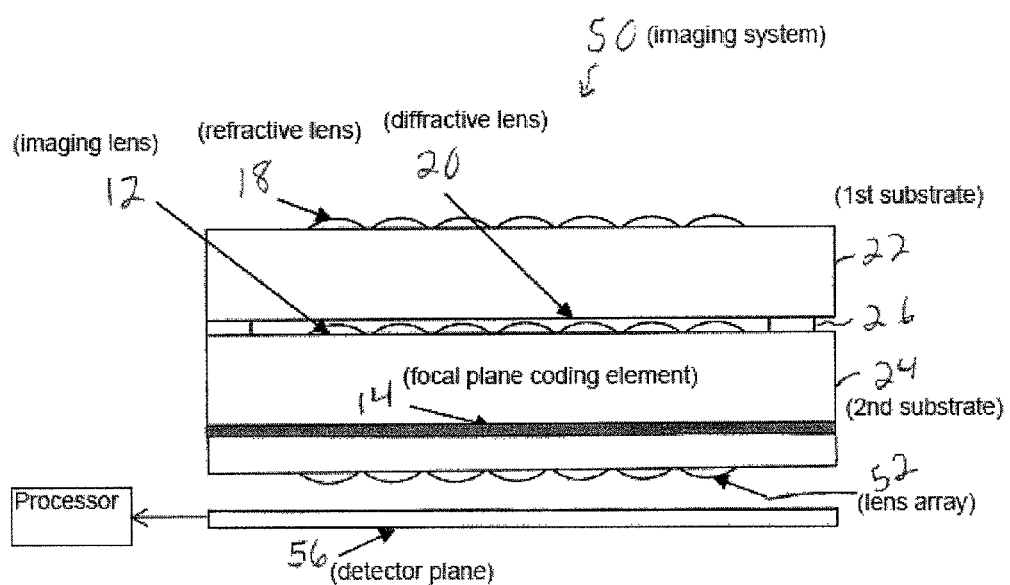
FIG. 3 is a schematic side view of an array of microcameras according to another embodiment of the present invention.

Another imaging system 50 is shown in FIG. 3. Here, sensors in a detector plane 56 are too far from the focal plane coding element 14 to receive all of the light transmitted therefrom. In order to address this, another array of lenses 52 is provided for imaging the output of the focal plane coding element 14 onto the sensors in the detector plane 56.

While the above coding has assumed that all measurements are used, i.e., a non-compressive design, compressive coding may also be used. In compressive system design, unimportant coefficients of the coefficient vector m are discarded, thus turning the corresponding row in the transform matrix H to 0. Therefore, fewer pixels may need to be employed, i.e., no physical implementation of these pixels for the discarded terms is required. Thus, the number of electronically generated image pixels is greater than the number of physical pixels. The compression ratio is defined by the number of rows to the number of columns in the transform matrix Further, the above coding has assumed a transform matrix having elements from the set (1, 0). Transform matrices having elements from other sets, e.g., (1, −1, 0) may be used. To approximate a (1, −1, 0) matrix, a threshold t is established. Any element having a value greater than t is set to 1, any element having a value less than −t is set to −1 and all others are set to 0. Any threshold with an acceptable condition number for the matrix transform may be used. Such matrices may be implemented using photonic crystals or a combination of amplitude and phase masks.

Thus, focal plane coding uses optical elements to encode digital imaging systems such that the spatial resolution of the reconstructed image exceeds the nominal spatial resolution of the electronic focal plane. Focal plane coding may be used to make cameras thinner than existing cameras while maintaining resolution and/or to improve resolution and data efficiency of digital imaging systems.

Embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. An imaging system, comprising:
an array of lenses;
a plurality of detectors for each lens, the detectors being on an image plane of the imaging system; and
a corresponding plurality of focal plane coding elements, a focal plane coding element provided for each detector, each focal plane coding element having multiple sub-pixel resolution elements, each sub-pixel resolution element being smaller than a detector, a pattern of the multiple sub-pixels resolution elements being substantially the same for the plurality of detectors associated with a corresponding lens, the plurality of focal plane coding elements being between the lens and the plurality of detectors, wherein at least two of the focal plane coding elements provided for the plurality of detectors associated with different lenses have different patterns of multiple sub-pixel resolution elements, an output of the plurality of detectors for each lens together representing an input image multiplied by a selected transform matrix.

2. The imaging system as recited in claim 1, wherein the focal plane coding element provides sub-pixel shifted multiple images on each sensor pixel.

3. The imaging system as recited in claim 1, wherein the focal plane coding element is an apertured mask.

4. The imaging system as recited in claim 1, further comprising color filters.

5. The imaging system as recited in claim 4, wherein the color filters are the sub-pixel resolution elements.

6. The imaging system as recited in claim 1, further comprising a birefringent structure adjacent the focal plane coding element.

7. The imaging system as recited in claim 1, further comprising a corresponding plurality of focusing lenses, a focusing lens between the focal plane encoding element and a corresponding sensor pixel.

8. The imaging system as recited in claim 1, wherein the selected transform matrix has fewer rows than columns.

9. The imaging system as recited in claim 1, wherein at least one sensor pixel receives light from more than one lens of the array of lenses.

10. The imaging system as recited in claim 1, further comprising a processor receiving the outputs of the sensor pixels and multiplying the outputs by an inverse of the selected transform matrix.

11. The imaging system as recited in claim 10, wherein the processor reconstructs an image from the outputs, a number of image pixels in the image being greater than the plurality of sensor pixels.

12. An imaging system, comprising:
an array of lenses;
a plurality of detectors for each lens;
a corresponding plurality of detectors, a filter provided for each detector, each filter having multiple sub-pixel resolution elements, each sub-pixel resolution element being smaller than a detector, a pattern of the multiple sub-pixels resolution elements being substantially the same for the plurality of detectors associated with a corresponding lens, and providing a sub-pixel shifted multiple image on each sensor pixel, the filter being between the lens and the plurality of detectors; and
a processor receiving outputs from each detector, the plurality of detector for each lens together representing an input image multiplied by a selected transform matrix, and reconstructing an image, a number of image pixels in the image being greater than the plurality of detectors.

13. The imaging system as recited in claim 12, further comprising a birefringent structure adjacent the plurality of filters.

14. The imaging system as recited in claim 12, further comprising a corresponding plurality of focusing lenses, a focusing lens between the filter and a corresponding sensor pixel.

15. The imaging system as recited in claim 12, wherein at least one sensor pixel receives light from more than one lens of the array of lenses.

16. The imaging system as recited in claim 12, wherein the filter is an apertured mask.

17. The imaging system as recited in claim 1, wherein the focal plane coding element is closer to the plurality of sensor pixels than to the array of lenses.

18. The imaging system as recited in claim 12, wherein the filter is closer to the plurality of sensor pixels than to the array of lenses.

19. The imaging system as recited in claim 18, wherein the filter is closer to the plurality of sensor pixels than to the array of lenses.

20. The imaging system as recited in claim 12, wherein the selected transform matrix has fewer rows than columns.

21. The imaging system as recited in claim 1, wherein a majority of patterns of multiple sub-pixel resolution elements are different from one another.

22. The imaging system as recited in claim 1, wherein a majority of patterns of multiple sub-pixel resolution elements block substantially half of incident light.

23. The imaging system as recited in claim 1, wherein each pattern of multiple sub-pixel resolution elements includes a plurality of apertures.

24. The imaging system as recited in claim 1, wherein at least one pattern of multiple sub-pixel resolution elements transmits substantially all incident light.

25. The imaging system as recited in claim 12, wherein a majority of patterns of multiple sub-pixel resolution elements are different from one another.

26. The imaging system as recited in claim 12, wherein a majority of patterns of multiple sub-pixel resolution elements block substantially half of incident light.

27. The imaging system as recited in claim 12, wherein each pattern of multiple sub-pixel resolution elements includes a plurality of apertures.

28. The imaging system as recited in claim 12, wherein at least one pattern of multiple sub-pixel resolution elements transmits substantially all incident light.

29. The imaging system as recited in claim 12, wherein color filters serve as sub-pixel resolution elements.

30. An imaging system, comprising:
an array of lenses;
a plurality of detectors for each lens, the detectors being on an image plane of the imaging system; and
a corresponding plurality of multiple image blocking portions provided for each detector, each image blocking portion being smaller than a detector, a pattern of multiple image blocking portions being substantially the same for the plurality of detectors associated with a corresponding lens, the plurality of multiple image blocking portions being between the lens and the plurality of detectors, wherein at least two patterns of multiple image blocking portions associated with different lenses are different, an output of the plurality of detectors for each lens together representing an input image multiplied by a selected transform matrix.

31. The imaging system as recited in claim 30, wherein one lens of the array of lenses has no multiple image blocking portions associated therewith.

32. The imaging system as recited in claim 30, wherein the selected transform matrix is a Hadamard matrix.

33. The imaging system as recited in claim 30, wherein each image blocking portion is smaller than a detector in both directions.

34. The imaging system as recited in claim 33, wherein each image blocking portion in a pattern has equal dimensions in both directions.

35. The imaging system as recited in claim 1, wherein the selected transform matrix is a Hadamard matrix.

36. The imaging system as recited in claim 1, wherein each image blocking portion is smaller than a detector in both directions.

37. The imaging system as recited in claim 36, wherein each image blocking portion in a pattern has equal dimensions in both directions.

38. The imaging system as recited in claim 12, wherein the selected transform matrix is a Hadamard matrix.

39. The imaging system as recited in claim 12, wherein each image blocking portion is smaller than a detector in both directions.

40. The imaging system as recited in claim 39, wherein each image blocking portion in a pattern has equal dimensions in both directions.

* * * * *